(12) United States Patent
Weitzel

(10) Patent No.: US 7,161,683 B2
(45) Date of Patent: Jan. 9, 2007

(54) POLARIZATION-DEPENDENT GRATING INTERFEROMETER FOR MEASURING OPTICAL PROFILE DEPTH AND SPECTRAL PROPERTIES OF A SAMPLE

(75) Inventor: Thilo Weitzel, Tubingen (DE)

(73) Assignee: CAMPus Technologies AG, Urtenen-Schönbühl (CH)

( * ) Notice: Subject to any disclaimer, the term of this patent is extended or adjusted under 35 U.S.C. 154(b) by 0 days.

(21) Appl. No.: 10/502,195

(22) PCT Filed: Jan. 21, 2003

(86) PCT No.: PCT/EP03/00568

§ 371 (c)(1),
(2), (4) Date: Feb. 7, 2005

(87) PCT Pub. No.: WO03/060422

PCT Pub. Date: Jul. 24, 2003

(65) Prior Publication Data

US 2005/0117169 A1    Jun. 2, 2005

(30) Foreign Application Priority Data

Jan. 21, 2002  (DE)  ................... 102 02 120

(51) Int. Cl.
*G01B 9/02* (2006.01)
(52) U.S. Cl. ...................... 356/521; 356/453
(58) Field of Classification Search ................. 356/521
See application file for complete search history.

(56) References Cited

U.S. PATENT DOCUMENTS

| | | | | | |
|---|---|---|---|---|---|
| 3,614,235 | A | * | 10/1971 | Munnerlyn | ................. 356/514 |
| 5,038,032 | A | * | 8/1991 | Nishimura et al. | ..... 250/231.16 |
| 5,066,130 | A | * | 11/1991 | Tsukiji et al. | ................ 356/494 |
| 5,120,132 | A | * | 6/1992 | Spies et al. | .................. 356/499 |
| 5,164,790 | A |   | 11/1992 | McNeil et al. | |
| 5,565,986 | A | * | 10/1996 | Knuttel | ........................ 356/456 |
| 5,880,838 | A | * | 3/1999 | Marx et al. | ................. 356/498 |
| 6,061,136 | A | * | 5/2000 | Hayashi | ...................... 356/495 |
| 6,917,421 | B1 | * | 7/2005 | Wihl et al. | ................ 356/237.5 |
| 6,980,297 | B1 | * | 12/2005 | Maeda | ........................ 356/450 |

OTHER PUBLICATIONS

H. Giovannini and H. Akhouayri, "Interferometric configuration based on a grating interferometer for the measurement of the phase between TE and TM polarizations after diffraction by gratings", Nov. 1, 1995; Optics Letters, vol. 20, No. 21, p. 2255.*

(Continued)

*Primary Examiner*—Gregory J. Toatley, Jr.
*Assistant Examiner*—Denise B Anderson
(74) *Attorney, Agent, or Firm*—Dilworth & Barrese LLP

(57) ABSTRACT

The present invention relates to a spectrally dispersive interferometric optical apparatus having a light source, generating a phase shift, measuring the intensity of the interference signals, selectively measuring the intensity of the interference signal and determining the phase angles and/or a relative phase shift of the intensity of the interference signals. In accordance with the invention, the generating of a phase shift between components of different polarization directions in at least one of the branches of the interferometer includes a diffraction grating. The selective determination of the intensity of the interference signal in dependence on the polarization moreover permits determination of the respective intensity for the TE components and for the TM components of the interference signal with respect to the coordinate system of the diffraction grating.

6 Claims, 8 Drawing Sheets

OTHER PUBLICATIONS

S. Traeger, et al, "Polarization Sagnac Interferometer with a reflective Grating Beam Splitter", Optics Letters, vol. 25, No. 10, May 15, 2000; p. 722.*

Meshulach et al, "Real-time spatial-spectral interference measurements of ultrashort optical pulses", J. Opt. Soc. Am. B. vol. 14, No. 8, Aug. 1997, p. 2095.*

* cited by examiner

(PRIOR ART)

(PRIOR ART)

POLARIZATION-DEPENDENT GRATING INTERFEROMETER FOR MEASURING OPTICAL PROFILE DEPTH AND SPECTRAL PROPERTIES OF A SAMPLE

The invention relates to dispersive interferometric optical arrangements which include a diffraction grating as well as to measuring methods which utilise the special properties of these apparatuses with respect to the relative phase positions of the two polarisation components of the detected light.

The invention further comprises the use of these apparatuses and methods

- for the measurement of the profile depth or of the spatial modulation stroke of optical diffraction gratings;
- for the measurement of changes to an optical path length either due to spatial change or to variation of a refractive index;
- for the measurement of lateral displacements of a diffraction grating;
- for the measurement of a relative phase shift between components of different polarisation and generated by a birefringent material;
- for the measurement of a rotation of the polarisation generated by a sample subjected to transmission (optical activity of the sample) as well as a spectroscopic measuring process for the spectrally resolved determination of the complex-valued refractive index of a material, i.e. simultaneously absorption and refractive index or spectral variation of the refractive index and, optionally, polarisation-dependent properties of a sample material introduced into an arm of the interferometer.

The profile depth of a diffraction grating working in reflection or, more generally, the modulation stroke of a periodic diffraction structure of any desired type or of a hologram is, in addition to the actual shape of the periodic profile and the complex-valued refractive index of the material used, the most important parameter which determines the diffraction efficiency. The profile depth must therefore be inspected with high precision in the manufacture or testing of such elements.

The following discussion relates, without limiting the generality, to diffraction gratings working in reflection at large angles. The relationships apply equally, however, to transmission gratings and to both phase gratings and absorption gratings and thus also to equivalent diffraction structures such as acousto-optical modulators or volume holograms.

FIG. 1 shows the surface of a sinusoidal diffraction grating (G) and the directions of an incident collimated light beam (I) of the reflected beam (0) and of the diffracted beam (−1) with the associated angles ($\theta_I$, $\theta_0$, $\theta_{-1}$) with respect to the grating normals. The designations "0" and "−1" stand for the zeroth or the first order diffraction. No further diffraction orders occur in the technically advantageous geometry shown. The arrangement shown and similar arrangements, for instance the autocollimation arrangement or Littrow arrangement ($\theta_1=\theta_{-1}$), show high spectral resolution and the diffraction efficiency shows no so-called anomalies (Wood's anomaly) over wide angular ranges or wavelength ranges which occur in connection with higher diffraction orders.

The fact is particularly interesting that the so-called equivalency theory applies to such gratings or arrangements in which no higher diffraction orders occur: the diffraction efficiency of such gratings in dependence on the angle and on the wavelength is determined solely by an effective profile depth and is largely independent of the actual shape of the profile (cf. Equivalence of ruled, holographic, and lamellar gratings in constant deviation mountings; M. Breidne, D. Maystre; Applied Optics 19, 1812–1821 (1980)).

The equivalency theory can be easily understood if the respective periodic grating profile is represented as a Fourier series and the interaction of the incident light is shown with the respective components of the Fourier series. The actual grating period defines the main component of the Fourier series and is thus responsible for the first order diffraction; the further components generate the higher orders of diffraction. If the geometry does not allow any higher orders of diffraction, the corresponding components of the Fourier series do not play any role and the grating behaves like a sinusoidal grating with an effective optical profile depth corresponding to the main component of the Fourier series. It is therefore possible largely to characterise such gratings by an effective optical profile depth.

FIG. 2 shows the diffraction efficiency to be expected for such a grating made of electrically very conductive material, for instance a holographically generated gold-coated grating, in dependence on the relative profile depth. The relative profile depth is the ratio of the actual profile depth to the spatial period of the grating.

The diffraction efficiency in dependence on the profile depth differs greatly for the two possible components of the polarisation of the incident light beam: TE polarised light (E field component parallel to the grating lines) is influenced much less than TM polarised light (E field component perpendicular to the grating lines).

The effect can be explained by the fact that TE polarised light, unlike TM polarised light, can only enter into interaction with a part of the actual grating profile since electrons are only movable along the grating lines in the upper layers of the grating profile, i.e. in the peaks of the profile.

Accordingly, FIG. 2 first shows—with increasing relative profile depth—a fast increase in the efficiency for TM polarised light, while the efficiency for TE polarised light only increases slightly. In the example shown, the efficiency for TM polarisation reaches a maximum at a relative profile depth of approximately 0.32, then again falls to a minimum at approximately double the profile depth as a consequence of the "overmodulation" and then strives towards a further maximum, whereas the TE component still slowly strives towards its first maximum.

Diffraction gratings or arrangements are technically of particular interest which show the same diffraction efficiency for TM polarised light and for TE polarised light. For instance, when used in spectrometers, the intensity of the incident radiation can then be measured independently of the respective polarisation. In FIG. 2, such a grating is characterised by a relative profile depth at which the curves for the TM efficiency and the TE efficiency intersect; that is in the example shown at relative profile depths of approximately 0.66 or approximately 0.83.

The determination of the effective optical profile depth of a grating is therefore of particular interest both for manufactures and for users of diffraction gratings. Currently, scanning tunnelling microscopes and atomic force microscopes are also used to measure grating profiles directly in addition to the measurement (optionally dependent on angle and/or on wavelength) of the efficiencies for diffraction and reflection by a suitably precise measurement of the intensities of an incident beam and of the diffracted or reflected beams for the calculation of the effective optical profile depth. The determination of the profile depth using the different intensities is relatively inaccurate if demands made on the precision of the measuring apparatus and its calibration are not very high. The determination of the effective optical profile depth using atomic force microscopy or scanning tunnelling microscopy is technically demanding and requires a high effort with respect to the physically mathematical models which the measured "force surfaces" or "tunnel surfaces" introduce into suitable calculation methods for the determination of the optical properties.

SUMMARY OF THE INVENTION

The invention presented relates to an interferometric arrangement which sets the optical profile depth of a diffraction grating into relation with the relative phase shift of the two measured signals which are recorded for the different polarisation directions and which are generated on a variation of the optical path lengths.

Variants of this arrangement can therefore be used equally for the measurement of the profile depth of a grating or—with known properties of the grating—for the measurement of changes to the optical path length. The path length measurement also makes possible the determination of refractive index changes.

If the spectral selectivity of the arrangements is additionally utilised, a use of the arrangement is also possible as a spectrometer which measures—in dependence on the wavelength—not only the absorption of a sample subjected to transmission, but simultaneously also the spectral variation of the refractive index and, optionally, polarisation-dependent parameters, for instance the optical activity (rotation of the polarisation) or anisotropy of the refractive index (birefringent material).

The fact is utilised in this process that TM polarised light beams and TE polarised light beams do not only "see" different profile depths of a diffraction grating, since TM waves and TE waves interact differently with the structured surface and are therefore diffracted or reflected with difference efficiencies, but that TM waves and TE waves thus also perceive the diffraction grating at slightly different spatial positions. A difference in the optical path lengths between TM components and TE components dependent on the profile depth and on the respective arrangement thus arises for the diffracted and reflected beams and thus a phase shift between the TM components and the TE components.

RRIEF DESCRIPTION OF THE DRAWINGS

The present invention will be described in greater detail with reference to the accompanying drawings in which FIG. 1 schematically illustrates directions of an incident light beam upon a sinusoidal diffraction grating;

Figure 5A:
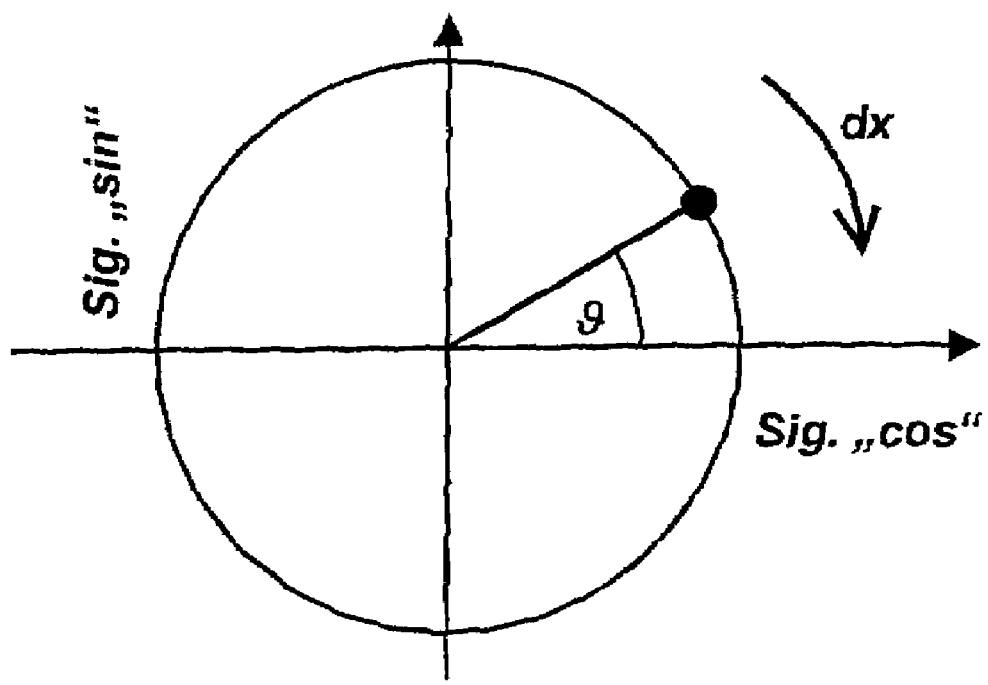
Figure 5B:
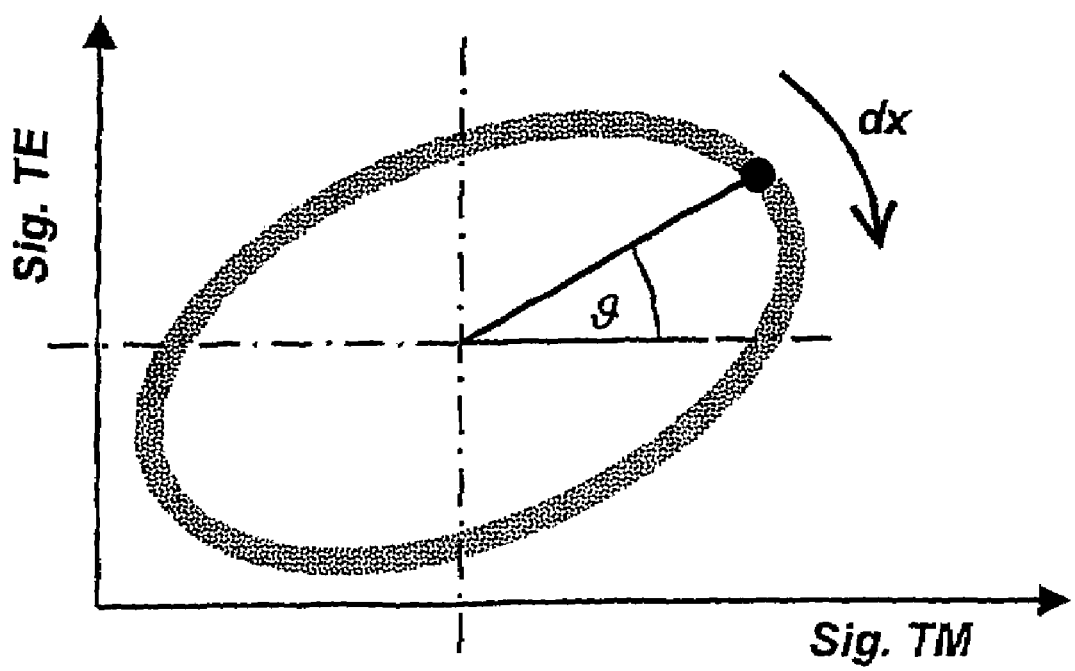
Figure 6A:
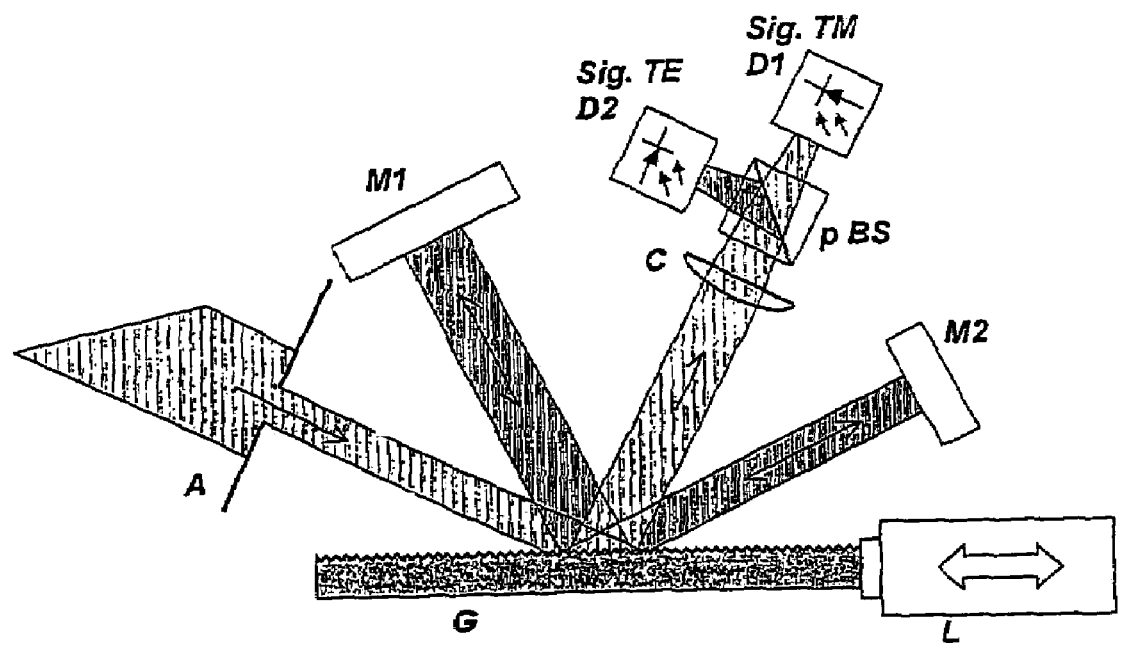
Figure 6B:
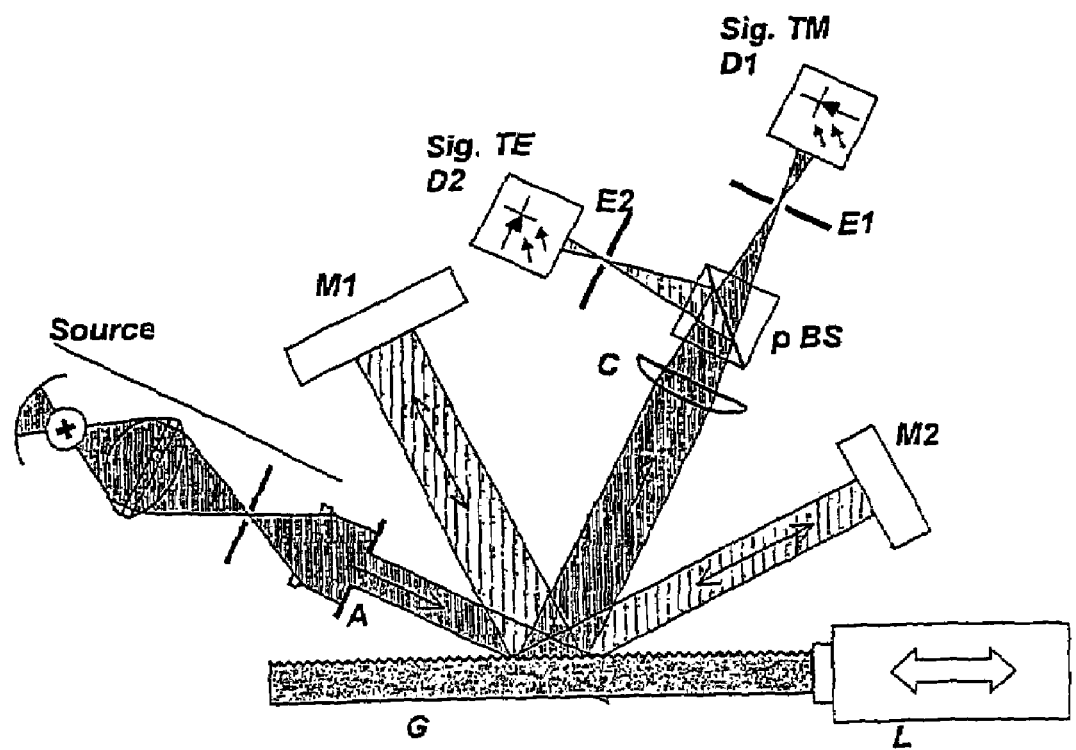

FIG. 5*a* illustrates a schematic diagram for determining direction of movement using the two signals;

FIG. 5*b* is a graph for determining the position from the measured signals;

FIG. 6*a* is a schematic illustration of a technical arrangement in accordance with the present invention;

FIG. 6*b* schematically illustrates a variant of the arrangement shown in FIG. 6*a;*

Figure 7A:
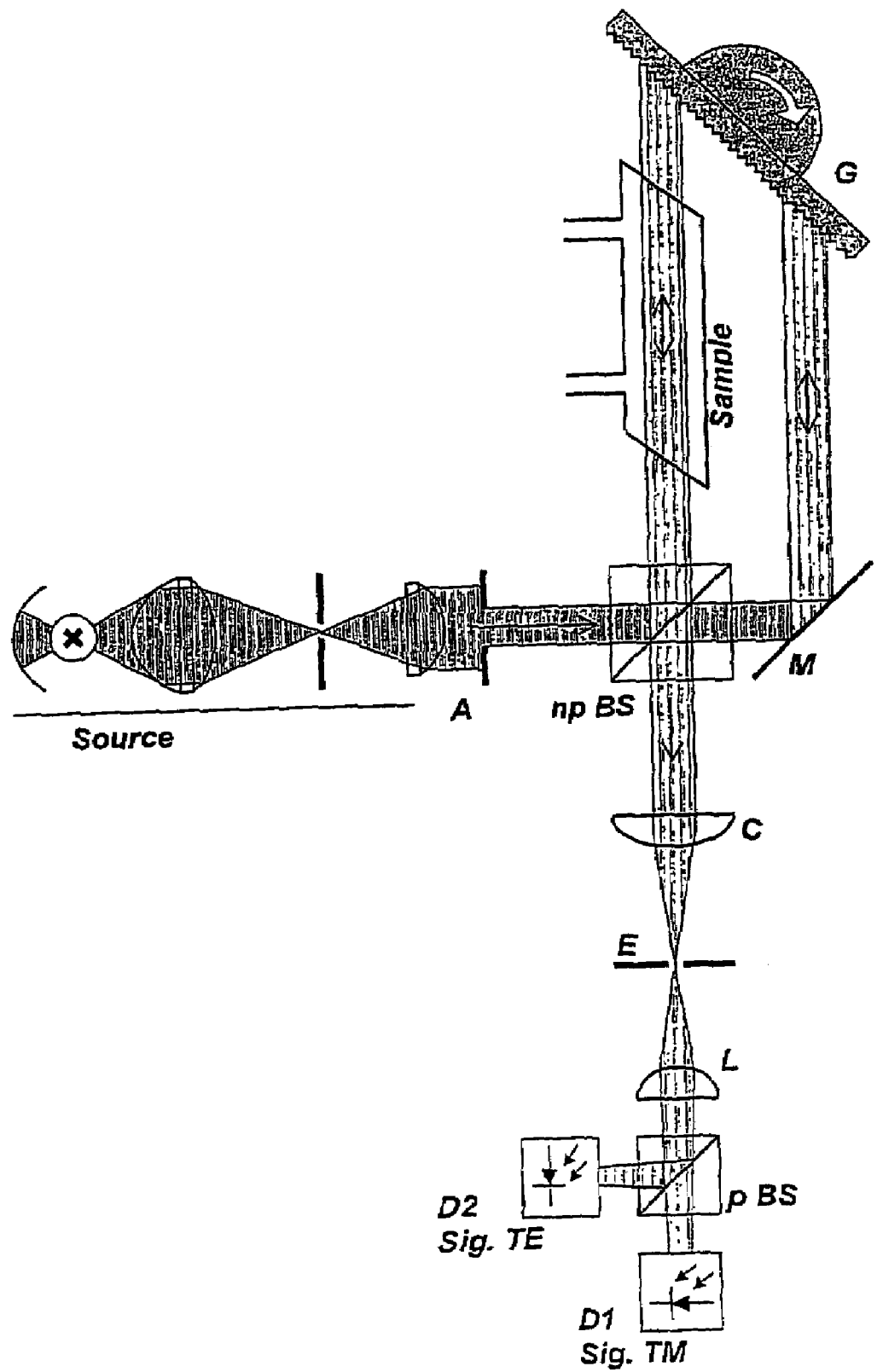
Figure 7B:
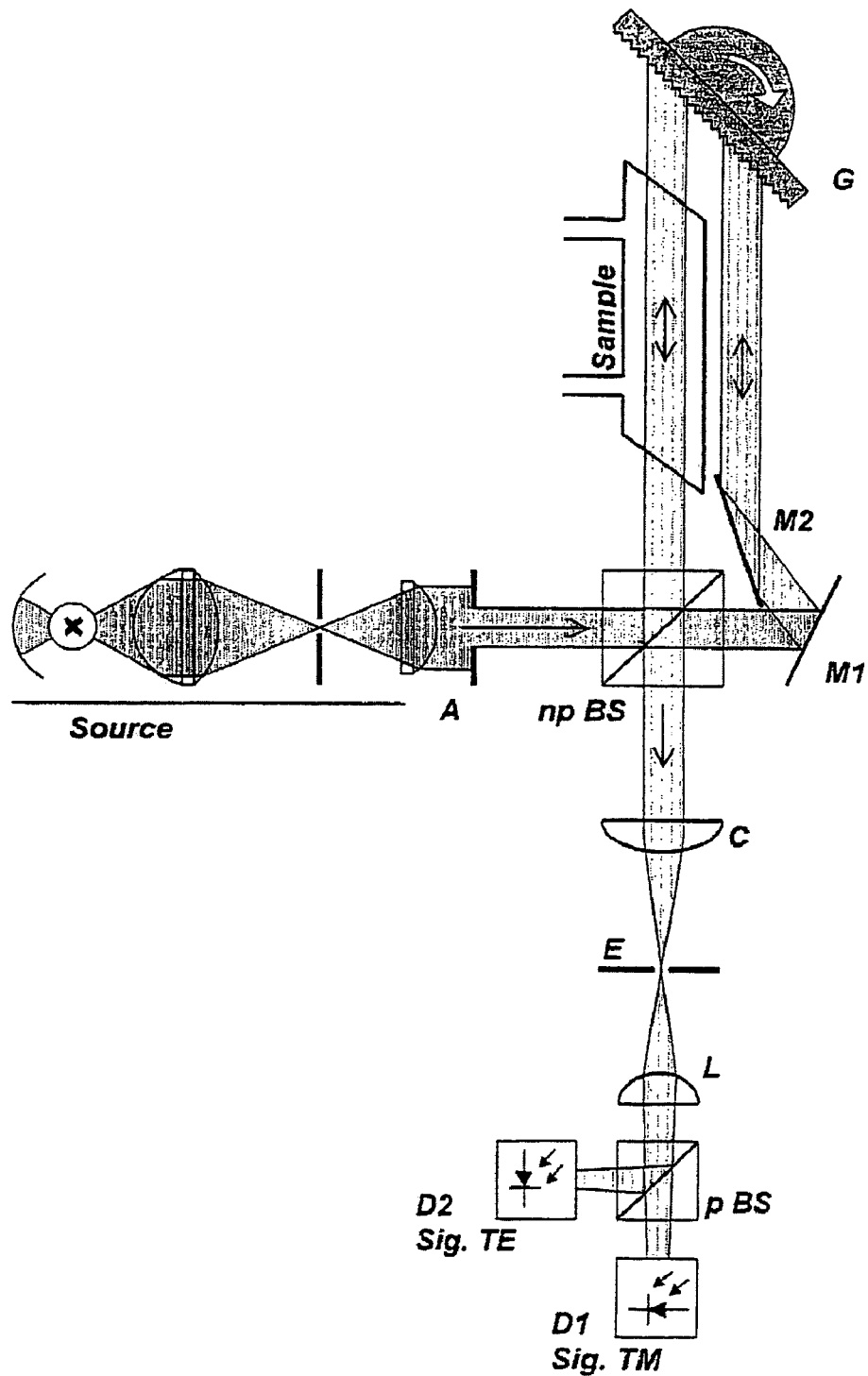

FIG. 7*a* schematically illustrates use of a technical arrangement in accordance with the present invention; and FIG. 7*b* schematically illustrates a variant of the use shown in FIG. 7*a*.

DESCRIPTION OF THE PREFERED EMBODIMENTS

The precise relationship between efficiencies and phase shift can be determined theoretically—starting from Maxwell's equations and from the material properties—using different mathematical processes (cf. Topics in Current Physics: Electromagnetic Theory of Gratings; R. Petit Editor; Springer Verlag 1980).

In the case of volume structures, i.e. layer systems or volume holograms, precisely corresponding phase shifts occur as a consequence of the refractive index dependence of the phase shift on reflection at or transmission through a surface.

Generally, the relationship can also be derived from the dispersion relations: different spectral properties—as in this case with respect to the TM components and the TE components—must correspondingly affect the relative phase position of the respective reflected or diffracted beams. This relationship also suggests the reverse conclusion that the relative phase shift disappears with equal efficiencies, i.e. with equal spectral properties.

Such relative phase shifts can be determined very precisely using an interferometric assembly when the possibility is provided of measuring TM components and TE components singly or independently of one another.

The type of the interferometric arrangement is of subordinate importance in this process; both the measurement of a fixed spatial interference pattern with correspondingly fixed path length differences and the dependence of the intensity on a path length change in a Michelson-like arrangement, a Mach-Zehnder-like arrangement or a Fabry-Perot-like arrangement can be used. Interferometric arrangements comparable to the variant shown in FIG. 6*a* which uses the grating itself as a beam splitter are also particularly suitable.

For TM components and TE components, respective periodically occurring maxima and minima of the intensity can be measured which are dependent on the path length differences in the interferometer and which show a phase shift dependent on the effective optical profile depth. This phase shift can be determined very precisely with little effort; in particular, the determination of the phase shift does not require the measurement of absolute intensities or intensity relationships and it is very robust with respect to different interferences such as a constant background or noise superimposed on the measured signals.

Michelson interferometers are known for use as a path length sensor which—with the aid of birefringent elements and a polarisation-dependent measurement of the interference signal—deliver two signals out of phase by 90°. One possibility exists in a counter-rotating circular polarisation of the beams from the two arms of the interferometer brought into interference by suitable birefringent optical elements. Using a polarising beam splitter, two linearly polarised components can be obtained whose intensity curve has a phase shift of 90° on path length changes.

A sufficient, constant phase shift—also differing from 90°—always allows both the determination of the direction of the movement using the two signals and a more precise determination of the position using numerical determination of the respectively current phase angle (see FIG. 5*a*, 5*b*).

In contrast to such an arrangement, an arrangement in accordance with the invention for the measurement of path length, in accordance with FIG. 6b, for instance, shows substantial advantages.

Figure 1:
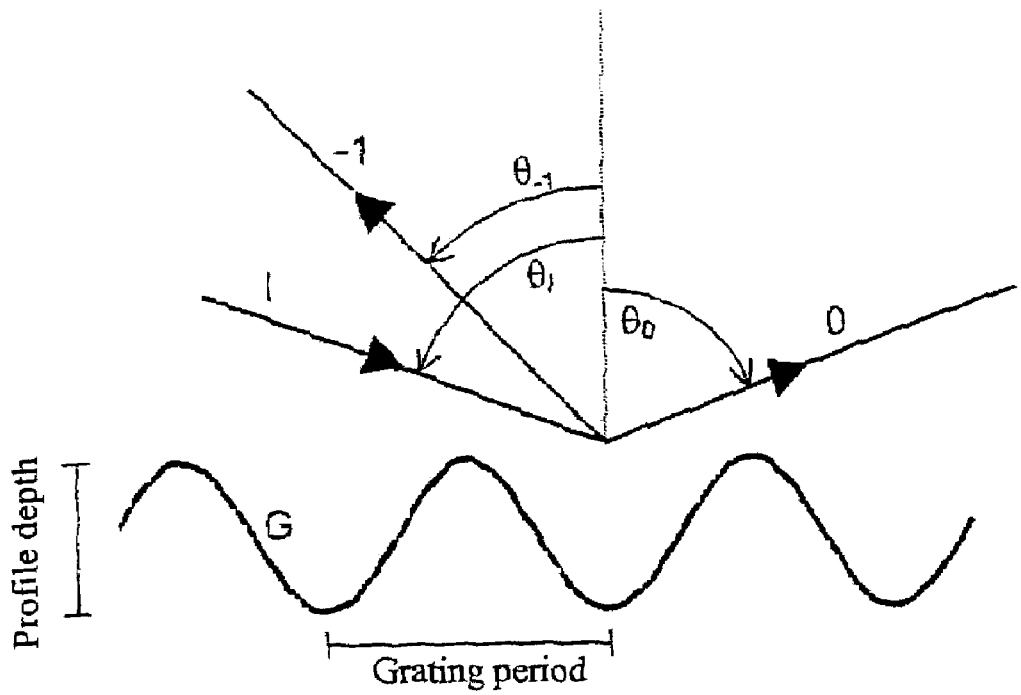
Figure 2:
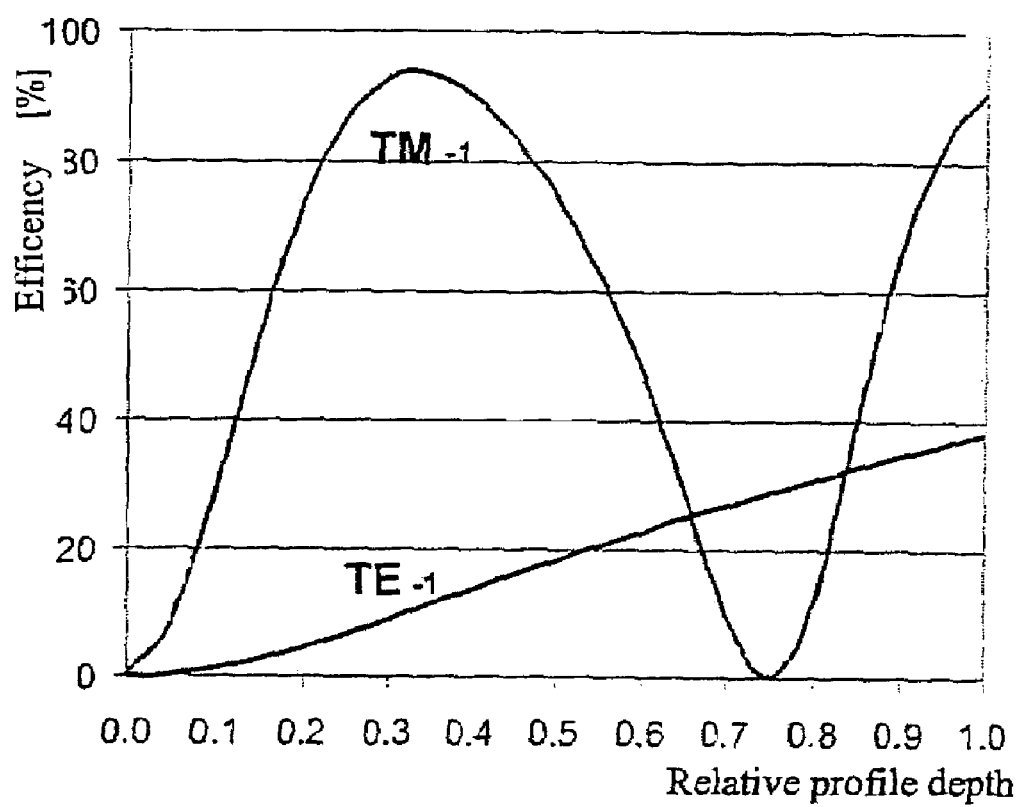
FIG. 2 is a graph of diffraction efficiency for the diffraction grating.
Figure 3:
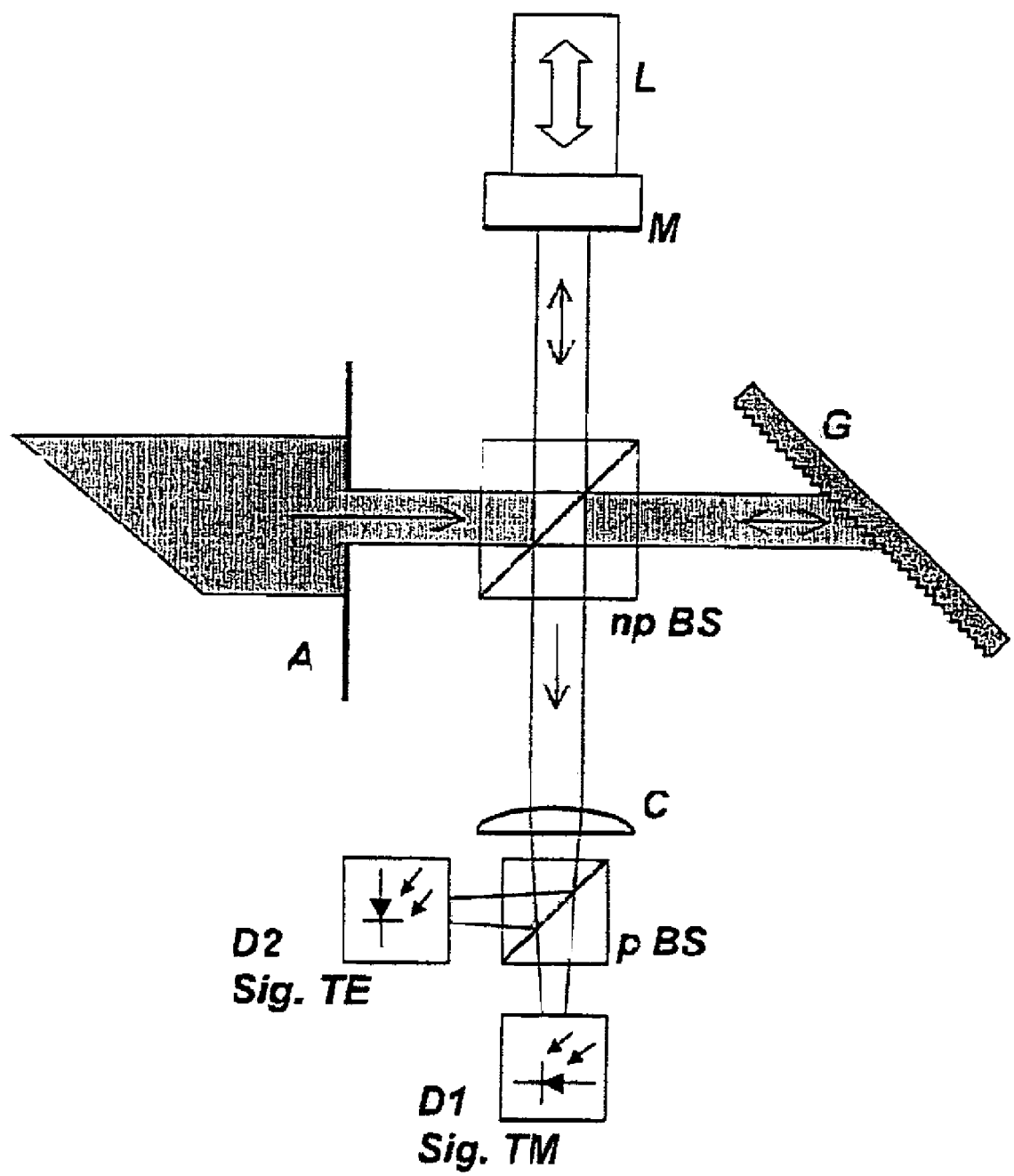
FIG. 3 is a schematic illustration of a technical arrangement in accordance with the present invention.

FIG. 3 first shows a technical arrangement in accordance with the invention designed in the manner of a Michelson interferometer. A collimated, monochromatic light beam is first incident through a suitable diaphragm (A) onto a non-polarising beam splitter (np BS). The incident beam is either not polarised or polarised at approximately 45°. The incident beam thus shows—with respect to the coordinate system of the diffraction grating (G)—respective TE components and TM components which are split equally in each case into the arms of the interferometer by the non-polarising beam splitter. One arm of the interferometer is terminated by a mirror (M) which reflects the beam back to the beam splitter. The second arm of the interferometer is terminated by the diffraction grating (G) to be examined in a Littrow arrangement or an autocollimation arrangement, i.e. the beam diffracted by the grating is reflected back to the beam splitter. The reflected beam or a beam diffracted at a different angle could also be detected with the help of additional optical elements.

In the arrangement shown, the optical path length of the first arm can be varied in a defined manner by a linear actuator (L) which can displace the mirror (M) along the optical axis. The optical path length of the second arm of the interferometer to the grating remains constant, but is effectively different for the two components of the polarisation as a consequence of the phase effect of the diffraction grating shown above.

The part beams from the two arms of the interferometer are again superimposed by the non-polarising beam splitter (np BS) and reach the polarising beam splitter (p BS) which splits the TE and TM components and delivers them to separate photo-detectors (D1, D2). The intensities of the interference signals for TE components (Sig. TE) and TM components (Sig. TM) are thus detected independently of one another. In the technical realisation of the arrangement, further optical components can become necessary, for instance the collimator (C) shown.

The detector signals are delivered to a measuring arrangement which determines the phase shift sought—for instance, by numerical processes.

Figure 4:
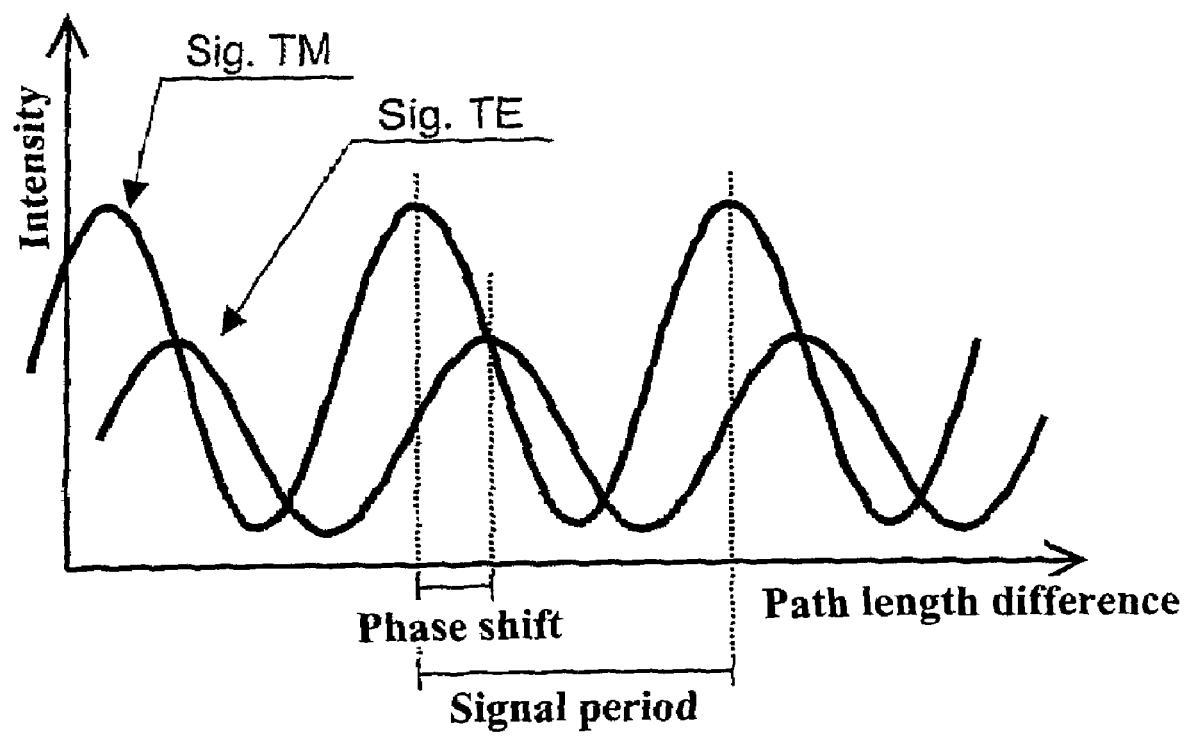
FIG. 4 is a graph of intensity for two measured signals from respective detectors in accordance with the present invention.

FIG. 4 shows an example for the signals of the two detectors (Sig. TM, Sig. TE) in dependence on the path length difference introduced by the linear actuator. The signals are sinusoidal and show a period corresponding to half the wavelength of the monochromatic light used as well as a phase shift of the two periodic interference signals in dependence on the effective profile depth of the diffraction grating. The phase shift of the signals is thus a measure for the profile depth of the grating. This profile depth can therefore be determined with great accuracy with reference to such measured data, even if neither the intensity measurement nor the path length measure are calibrated to absolute values.

FIG. 5b shows a general example for the two measured signals shown as a Lissajous figure or as an XY diagram. The angle $\partial$, which is a measure for the current phase angle, can recognisably also be determined reliably for signals of different amplitude and in the presence of noise and offsets.

FIG. 6a shows a particularly advantageous technical embodiment of an arrangement in accordance with the invention which uses the diffraction grating simultaneously as a beam splitter and for the generation of the phase shifts. This arrangement also advantageously allows the continuous rotation of the phase angle by a lateral movement of the grating, i.e. without any actual path length change, in addition to the path length change in one of the arms of the interferometer. Such an arrangement is advantageous with light sources with a short coherent length.

FIG. 6b shows the arrangement with added collimator and collector lenses and defined entrance and exit apertures. This particularly advantageous arrangement utilises the spectral dispersion of the diffraction grating for the selection of a defined wavelength. The wavelength can be set precisely via a suitable change of the angles at which the beams hit the diffraction grating.

This is particularly advantageous when, instead of a laser, a light source with a broader band should be used for the precise measurement of wavelengths, since the wavelength of the measurement serves as the measure.

FIGS. 7a and 7b show examples for a use of arrangements in accordance with the invention as innovative spectrometers. FIG. 7a is described first:

The non-polarised, collimated beam of a light source (Source), after passing through an aperture (A), reaches a non-polarising beam splitter (np BS) which generates two part beams. One part beam reaches the diffraction grating (G) via a mirror (M); the other part beam reaches the diffraction grating (G) after passing through a sample volume (Sample). The diffraction grating is rotatably supported (see Figure, grating lines and rotational axis perpendicular to the plane of the drawing). The diffraction grating diffracts the part beams back (Littrow arrangement), with a spectral component of the respective part beams dependent on the respective angle again precisely reaching the beam splitter. The superimposed part beams reach an exit gap (E) via the collector lens (C) and then the polarisation-sensitive detector.

The polarisation-sensitive detector is realised in the example shown with the help of a lens (L) which focuses the light coming from the aperture (E) through a polarising beam splitter (p BS) onto two detectors (D1, D2).

A particularly interesting variant of this arrangement (FIG. 7b) has the effect through a pair of mirrors (M1, M2) that the part beams are superimposed with counter-rotating spectral dispersion after passing through the interferometer. This results in a spectrally high-resolution selection of the interference signal (cf. DE 198 01 469 A), also with a wide exit gap (E).

The invention claimed is:

1. A spectrally dispersive interferometric optical apparatus, comprising
    a light source,
    an aperture through which a collimated, monochromatic light beam from the light source passes,
    a non-polarizing beam splitter upon which the light beam is incident after passing through the aperture and splitting the beam into branches of said apparatus,
    a mirror situated at an end of one of said branches to reflect the beam back to said non-polarizing beam splitter,
    a linear actuator arranged to displace said mirror along an optical axis towards and away from said non-polarizing beam splitter, a diffraction grating situated at an end of another of said branches such that the beam diffracted by said grating is directed back to said non-polarizing beam splitter,
said non-polarizing beam splitter arranged to superimpose the respective beams,
a polarizing beam splitter arranged to receive the superimposed beams from said non-polarizing beam splitter and split the same into separate TE and TM components, and
a pair of photodetectors separately arranged to receive a respective one of the separate TE and TM components.

2. The apparatus of claim 1, additionally comprising a collimator positioned between said non-polarizing and polarizing beam splitters.

3. A spectrally dispersive interferometric apparatus, comprising
a light source,
an aperture situated through which a light beam from said light source passes,
a diffraction grating situated to diffract and reflect the beam after having passed through said aperture to simultaneously split the light beam and shift phases between the TE and TM components,
a linear actuator arranged to laterally shift said diffraction grating,
two mirrors each situated to reflect a respective beam back to said diffraction grating where the beams are superimposed,
a polarizing beam splitter situated to receive the superimposed beams, and
a pair of photodetectors separately arranged such that each photodetector receives either the TE or TM component.

4. The apparatus of claim 3, additionally comprising
a collimator situated between said diffraction grating and polarizing beam splitter, and
two apertures each situated between a respective one of said photodetectors and said diffraction grating.

5. A spectrally dispersive, interferometric apparatus, comprising
a light source (Source),
en aperture (A) situated through which a light beam from said light source passes,
a non-polarizing beam splitter (np BS) upon which the light beam is incident after passing through said aperture and splitting the beam into two part beams,
a mirror (M) situated to reflect a first one of the part beams,
a rotatably-mounted diffraction grating (G) arranged to receive the part beam reflected by said mirror and diffract the beam back to the mirror,
a sample volume arranged through which a second one of the part beams reaches said diffraction grating which diffracts the second part beam back to said non-polarizing beam splitter which superimposes both diffracted part beams,
a polarizing beam splitter (p BS) situated to receive the superimposed beams and split the same into two beam components,
an exit aperture (E) and lens (C) situated through which the superimposed beams pass to said polarizing beam splitter, and
a pair of photodetectors (D1/Sig. TM, D2/Sig. TE) separately arranged to receive a respective one of the TM and TE polarized beam components from said polarizing beam splitter.

6. The apparatus of claim 5, additionally comprising
a second lens situated between said collimator lens and polarizing beam splitter, and
a second mirror situated between said first mirror and diffraction grating.

* * * * *